United States Patent Office 3,472,038
Patented Oct. 14, 1969

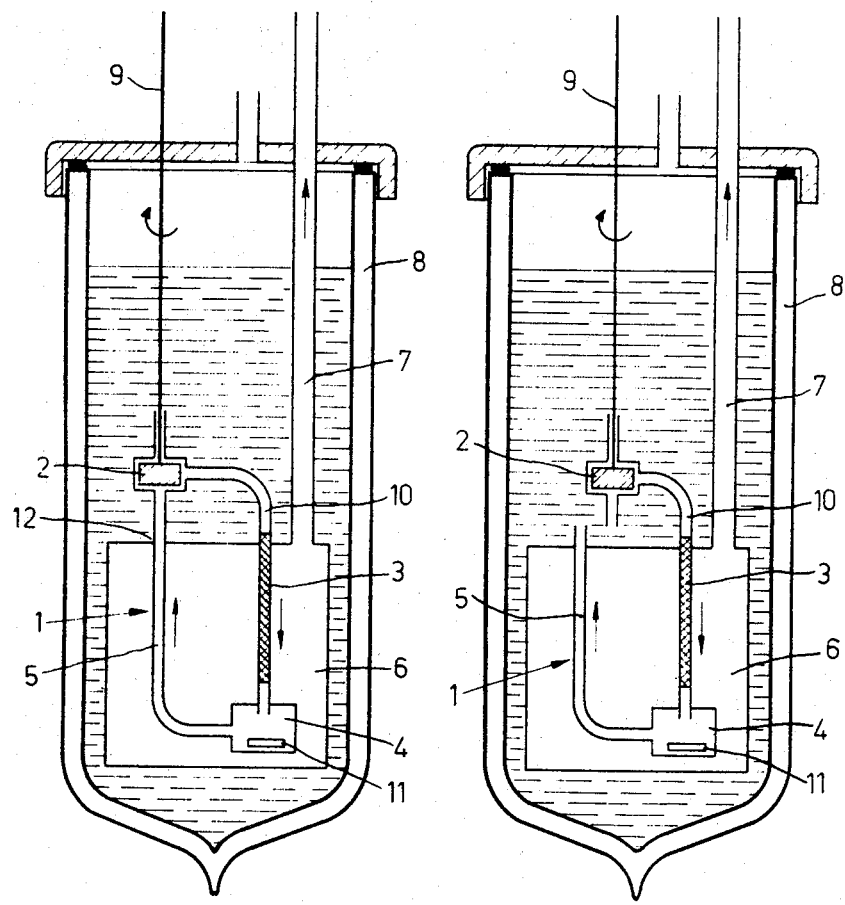

3,472,038
APPARATUS AND METHOD FOR TRANSFERRING HEAT FROM A LOWER TEMPERATURE LEVEL TO A HIGHER TEMPERATURE LEVEL
Frans Adrianus Staas, Emmasingel, Eindhoven, Netherlands, assignor, by mesne assignments, to U.S. Philips Corporation, New York, N.Y., a corporation of Delaware
Filed Apr. 19, 1968, Ser. No. 722,693
Claims priority, application Netherlands, Apr. 22, 1967, 6705713
Int. Cl. F17b 3/08, 3/10
U.S. Cl. 62—45       10 Claims

ABSTRACT OF THE DISCLOSURE

An apparatus and method for transferring heat from low to high temperature levels includes a pump to flow only superfluid $He^4$ through a superleak, whereby its temperature is reduced, to a thermally insulated container where a portion of this $He^4$ absorbs heat from an object to be cooled and is converted to normal $He^4$, and remaining superfluid $He^4$ flows turbulently through a return duct, entraining with it the heat-carrying normal $He^4$.

---

The invention relates to an apparatus and method for transferring heat from a lower to a higher temperature level, which is characterized in that both temperature levels lie below the temperature of the point of helium. The apparatus includes a circulating duct which is filled with $He^4$ and accommodates at least one body of material which is characterized in that normal $He^4$ cannot pass through it, but superfluid $He^4$ can, without giving rise to moving turbulence (superleak); this material extends along part of the duct and completely occupies its internal cross-sectional area. The circulating duct includes a pumping device capable of maintaining a pressure difference across this body. The said body and at least part of the duct situated at the lower-pressure side of the body are thermally insulated, and the part of the duct in communication with the higher-pressure side of the body being in thermal contact with a cooler in which a temperature prevails below the point of $He^4$. The dimensions of the internal cross-sectional area of the duct and the pumping device are chosen so that in flowing through them, the medium exceeds its critical velocity with consequent turbulence. The body of material characterized in that normal $He^4$ cannot flow through it, but superfluid $He^4$ can without the occurrence of turbulence, will hereinafter be referred to as a superleak.

The apparatus in accordance with the invention utilizes the fact that when in a U-shaped tube containing $He^4$ at a temperature below the point, there is provided a superleak across which a temperature difference prevails, a driving force is exerted on the superfluid helium which causes it to flow through the superleak towards the high temperature. This flow of superfluid helium continues until there is produced in the limbs of the U-shaped tube a difference in level which produces a pressure difference across the superleak, which compensates for the driving force which acts on the superfluid helium owing to the temperature difference. Conversely, the production of a pressure difference across the superleak will give rise to a temperature difference across it. If, now, an artticle is to be cooled at this low temperature, it will be brought into contact with the helium at this area. During the cooling process, however, heat from the article will be continuously supplied to the medium and will have to be carried away by the helium, however, exhibits entropy and hence heat will be that its entropy is zero so that it cannot transfer heat.

The apparatus according to the invention is based on the recognition that a continuous cooling process is obtained owing to the fact that turbulence will occur in the superfluid helium in the circulating duct, and that owing to the interaction of the turbulence in the superfluid helium on the normal helium, the latter will be carried along by the flow of superfluid helium. This entrained normal helium, however, exhibits entropy and hence heat will be carried along by this normal helium from the cold area to the cooled area at the higher temperature. This provides a surprisingly simple apparatus by means of which, starting from a temperature below the λ point of the helium, cold may be produced at lower temperatures.

In a further advantageous embodiment of the apparatus in accordance with the invention, the thermally insulated part of the device is disposed in a vacuum chamber which is surrounded by a bath of liquid $He^4$ at a temperature below the λ point, the part of the duct protruding from the vacuum chamber being also surrounded by the liquid $He^4$. Thus, in this apparatus the heat which may be withdrawn from an article to be cooled at 0.7° K. on the cold side of a superleak is transported to the $He^4$ bath.

In a further embodiment of the apparatus in accordance with the invention, the pumping device takes the form of a centrifugal pump disposed in the part of the duct protruding from the thermal insulation. The circulating duct need not be a closed duct of constant cross-section. The nonthermally insulated part, i.e. the part at the higher temperature, may include a container which is also filled with $He^4$.

In a further advantageous embodiment the part of the duct situated in the path of the liquid $He^4$ may be interrupted. Thus, the $He^4$ bath effectively forms part of the duct. This is possible since the duct contains the same medium as the surrounding bath.

The invention will now be described more fully with reference to the accompanying drawing, in which FIGURES 1 and 2 show schematically and not to scale two embodiments of the apparatus in accordance with the invention.

The apparatus shown in FIGURE 1 includes a circulating duct 1, containing $He^4$. A pumping device 2, a superleak 3 and a container 4 are disposed in the duct. The part of the duct constituted by the superleak 3, the container 4 and a pipe 5, is located in a vacuum chamber 6 which, through a pipe 7, is connected to a vacuum pump, not shown, to maintain the desired vacuum in the chamber 6. The part of the duct 1 protruding from the chamber 6 and accommodating the pump 2 is surrounded by liquid $He^4$, which also surrounds the chamber 6 and is contained in a Dewar flask. By means of a vacuum pump, not shown, the vapour pressure above the liquid helium in the Dewar flask 8 is reduced to a value such that the temperature of the liquid helium in the flask 8 is lower than the temperature of the λ point of helium. The temperature may, for example, be 1.3° K. The pump 2 is connected through a shaft 9 to a driving device, not shown. The apparatus operates as follows: On rotation of the pump 2 a higher pressure will be produced on the upper side of the superleak 3 at the area 10 and will drive the superfluid helium through the superleak. The superleak 3 may be in the form of pressed or sintered very finely divided substances, such as carborundum or iron oxide. The normal helium cannot pass through this superleak, preventing the convection of heat through it. Owing to the pressure difference across the superleak 3 a lower temperature will prevail in the container 4 than at the area 10. An article 11 to be cooled may be disposed in the container 4.

The part 5 of the duct is proportioned so that the superfluid helium exceeds its critical velocity therein with consequent turbulence. Owing to the interaction of the turbulence of the superfluid helium, part of the normal helium will be carried along towards the pump. By this normal helium, heat will be carried away from the container 4 towards the pump. At an area 12 the circulating medium comes into heat-exchange with the helium bath so that it will again be brought to the temperature of this bath. Thus, an amount of heat will be transferred from the container 4, which is at a low temperature of, for example, 0.7° K., to the helium bath, which is at a temperature of, say, 1.3° K. This provides a cooling apparatus in which the superfluid helium when flowing through the superleak 3 to the container 4 transfers no heat, whereas the superfluid helium when flowing from the container 4 to the pump 2 through the capillary 5, in which turbulence occurs, is capable of entraining some normal helium so as to produce heat convection.

FIGURE 2 shows an apparatus which broadly corresponds to the apparatus shown in FIGURE 1. The difference is that the part of the duct 1 which is surrounded by the $He^4$ bath is interrupted so that the capillary 5 opens into the bath and the suction side of the pump 2 is connected to the bath. Thus, the bath effectively forms a buffer chamber for the duct. The operation of this apparatus is identical to that of the apparatus of FIGURE 1.

What is claimed is:

1. A method of transferring heat between low and high temperature levels, both levels being below the temperature of the λ point of the $He^4$, comprising the steps:
   (a) flowing superfluid $He^4$ through a superleak, thereby reducing the temperature of this $He^4$;
   (b) flowing said reduced temperature $He^4$ into a thermally insulated container housing an object to be cooled;
   (c) absorbing heat from said object with some of said superfluid $He^4$ which is thereby converted to normal $He^4$;
   (d) flowing said superfluid $He^4$ turbulently from the container through a duct dimensioned such that the superfluid $He^4$ will flow turbulently;
   (e) entraining said normal $He^4$ with the turbulent flow of said superfluid $He^4$.

2. A method as defined in claim 1 comprising the further steps of pumping said superfluid $He^4$ through said superleak.

3. A method as defined in claim 2 comprising the further steps of flowing said superfluid $He^4$ and normal $He^4$ from said container to a pump, pumping said $He^4$ to said superleak, and cooling said $He^4$ to a temperature below the λ point before it reaches the superleak.

4. A method as defined in claim 3 comprising the further steps of immersing said pump, container and duct in a quantity of superfluid $He^4$ within a Dewar.

5. Apparatus for use with a source of superfluid $He^4$, for transferring heat between low and high temperature levels, both levels being below the temperature of the λ point of the $He^4$, comprising:
   (a) a superleak formed of material permeable to the flow therethrough of superfluid $He^4$ and impermeable to the flow of normal $He^4$;
   (b) means for providing a pressure difference across the superleak, with resulting high and low pressure sides of the superleak and a temp-difference thereacross when superfluid $He^4$ flows therethrough;
   (c) means for cooling the fluid entering the high-pressure side of the superleak to a temperature below the λ point of $He^4$;
   (d) a container for housing an object to be cooled and into which said superfluid $He^4$ from the superleak is flowable;
   (e) a duct extending from said container to said source;
   (f) means for thermally insulating the container and at least substantial parts of the superleak and the duct, and
   (g) the duct being dimensioned such that superfluid $He^4$ is flowable therethrough from the container at a greater than critical velocity and to thereby flow turbulently and entrain the normal $He^4$ into which heat from said object is absorbable.

6. Apparatus as defined in claim 5 wherein said means for providing a pressure difference is a pump.

7. Apparatus as defined in claim 5 further comprising a vacuum chamber housing for providing said thermal insulation.

8. Apparatus as defined in claim 5 wherein said duct discharges into said pump intake, thereby providing a closed circulatory system.

9. Apparatus as defined in claim 7 further comprising a Dewar containing liquid $He^4$ at a temperature below its λ point and in which said chamber and means for providing a pressure difference are immersed.

10. Apparatus as defined in claim 9 wherein said duct discharges into said liquid $He^4$ in the Dewar, and the means providing a pressure difference is a pump which intakes liquid $He^4$ from the Dewar.

References Cited

UNITED STATES PATENTS

| | | | |
|---|---|---|---|
| 3,195,322 | 7/1965 | London | 62—514 |
| 3,364,687 | 1/1968 | Kolm | 62—467 |
| 3,376,712 | 4/1968 | London | 62—467 |

LLOYD L. KING, Primary Examiner

U.S. Cl. X.R.

62—467

UNITED STATES PATENT OFFICE
CERTIFICATE OF CORRECTION

Patent No. 3,472,038      Dated October 14, 1969

Inventor(s) FRANS ADRIANUS STAAS

It is certified that error appears in the above-identified patent and that said Letters Patent are hereby corrected as shown below:

Col. 1, line 70, after "helium" delete ", however exhibits entropy and hence heat will be" and insert -- . Superfluid helium, however, has the property--

Signed and sealed this 4th day of May 1971.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,472,038　　　　　　Dated October 14, 1969

Inventor(s) FRANS ADRIANUS STAAS

It is certified that error appears in the above-identified patent and that said Letters Patent are hereby corrected as shown below:

Column 1, lines 31, 45 and 55, before "point"

insert -- $\lambda$ --

Signed and sealed this 19th day of October, 1971.

(SEAL)
Attest:

EDWARD M. FLETCHER, JR.　　　　ROBERT GOTTSCHALK
Attesting Officer　　　　　　　　Acting Commissioner of Patents